United States Patent
Young et al.

(10) Patent No.: US 7,266,398 B2
(45) Date of Patent: Sep. 4, 2007

(54) CIRCUIT FOR TRIGGERING ON-HOOK FUNCTION AND OFF-HOOK FUNCTION OF A COMMUNICATION APPARATUS

(75) Inventors: Sea Weng Young, Taoyuan (TW); Chun Chi Hsu, Taoyuan (TW); Wen Pin Liu, Taoyuan (TW)

(73) Assignee: Benq Corporation, Taoyuan, Taiwan (CN)

( * ) Notice: Subject to any disclaimer, the term of this patent is extended or adjusted under 35 U.S.C. 154(b) by 595 days.

(21) Appl. No.: 10/759,367

(22) Filed: Jan. 16, 2004

(65) Prior Publication Data

US 2004/0259607 A1    Dec. 23, 2004

(30) Foreign Application Priority Data

Jan. 20, 2003   (TW) .............................. 92101159 A

(51) Int. Cl.
*H04M 1/00* (2006.01)

(52) U.S. Cl. .............................. 455/575.2; 455/575.1; 455/569.1

(58) Field of Classification Search ............. 455/575.1, 455/578.3, 575.4, 569.1; 379/420.04, 420.03, 379/430, 164, 350, 377; 381/122, 91
See application file for complete search history.

(56) References Cited

U.S. PATENT DOCUMENTS 4,802,207 A * 1/1989 Uchida ........................ 379/164
6,122,369 A   9/2000 Hwang et al. .............. 379/420

FOREIGN PATENT DOCUMENTS

JP           2002-237873      * 8/2002

* cited by examiner

*Primary Examiner*—Melur Ramakrishnaiah
(74) *Attorney, Agent, or Firm*—Birch, Stewart, Kolasch & Birch, LLP

(57) ABSTRACT

The present invention is a circuit that is set in a communication apparatus. The circuit is co-operated with a button of an audio receiving/transmitting device for triggering an on-hook or off-hook function when the communication apparatus receives an incoming call. The button is normally closed. The on-hook and off-hook functions are triggered by a triggering signal which is higher than a threshold value. Thus, the present invention doesn't execute the on-hook or off-hook function by an on/off button set in the communication apparatus but directly execute the button set in the audio receiving/transmitting device, which improved the convenience of the communication apparatus.

11 Claims, 2 Drawing Sheets

CIRCUIT FOR TRIGGERING ON-HOOK FUNCTION AND OFF-HOOK FUNCTION OF A COMMUNICATION APPARATUS

BACKGROUND OF THE INVENTION

1. Field of the Invention

The present invention relates to a circuit for triggering an on-hook and off-hook function of a communication apparatus.

2. Description of the Prior Art

Mobile phones are the most universal mobile communication apparatus currently, but in some situations, users cannot conveniently use mobile phones. For example, when a user is riding a motorbike or driving a car, and there is an incoming call, the user may be diverting additional attention to communicate on the phone, and a traffic accident often happens under that situation; therefore, it is very dangerous.

In order to avoid that situation, each company has launched its own audio receiving/transmitting device for their mobile communication apparatus, such as the hands-free phone. The device lets the users communicate without having to hold the mobile phones, thus freeing their hands to perform other functions. However, the conventional audio receiving/transmitting device still has a disadvantage. When the mobile phones receives an incoming call, the user still needs to push button on the mobile phones for answering the phone; then, the user can talk by the mobile phones. When ending the phone call, the user must also need to push buttons on mobile phones to hang up; therefore, the conventional mobile phones is still not convenient to use.

SUMMARY OF THE INVENTION

The objective of the invention is to provide a circuit that is suitable for the audio receiving/transmitting device of the communication apparatus for solving the problem of the prior art.

The present invention relates to a circuit; the circuit is set in a communication apparatus, and it co-operates with a button of an audio receiving/transmitting device for triggering the on-hook function by pressing the button while the communication apparatus receives an incoming call, or triggering the off-hook function while ending the communication. The switch of the button is normally closed. The communication apparatus comprises an audio-signal receiving port, a bias source, and a detecting-signal input port. When the detecting signal value inputted in the detecting-signal input port is higher than a threshold value, the communication apparatus is triggered. The method of triggering is determined by the processor of the communication apparatus, and it can be for the on-hook or off-hook function.

The circuit comprises a connecting device, a first signal line, a second signal line, and a detecting device. The audio receiving/transmitting device electrically and detachably connects to the connecting device. The connecting device comprises an audio-signal input end, and the first signal line connects the audio-signal receiving port and the audio-signal input end. The second signal line connects the bias source and the first signal line. The detecting device electrically connects to the first signal line and the detecting-signal input port respectively, wherein a first connecting point is defined in the place where the detecting device electrically connects to the first signal line. The detecting device is used for detecting a detecting signal of a voltage value of the first connecting point and outputting a detecting-signal value of the detecting signal to the detecting-signal input port; the detecting signal value is a converted value.

When the audio receiving/transmitting device is electrically connected to the connecting device, the communication apparatus receives the incoming call, and the button is pressed, the circuit between the audio-signal input end of the connecting device and the audio receiving/transmitting device is temporarily broken. The detecting device detects that the detecting-signal value is higher than a threshold value, and then the on-hook function of the communication apparatus is triggered.

When the audio receiving/transmitting device is used in the communication apparatus and is communicating normally, and the button is pressed again, the circuit between the audio-signal input end of the connecting device and the audio receiving/transmitting device is temporarily broken again. The detecting device detects that the detecting-signal value at the first connecting point is higher than a threshold value; then, the off-hook function of the communication apparatus is triggered.

Therefore, by controlling the button appended in the audio receiving/transmitting device, the present invention can answer the incoming call and hang up the phone when the communication ends. Thus, it is unnecessary for the user to answer or hang up a phone call by using the button on the communication apparatus. The present invention avoids the disadvantage of the prior art.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
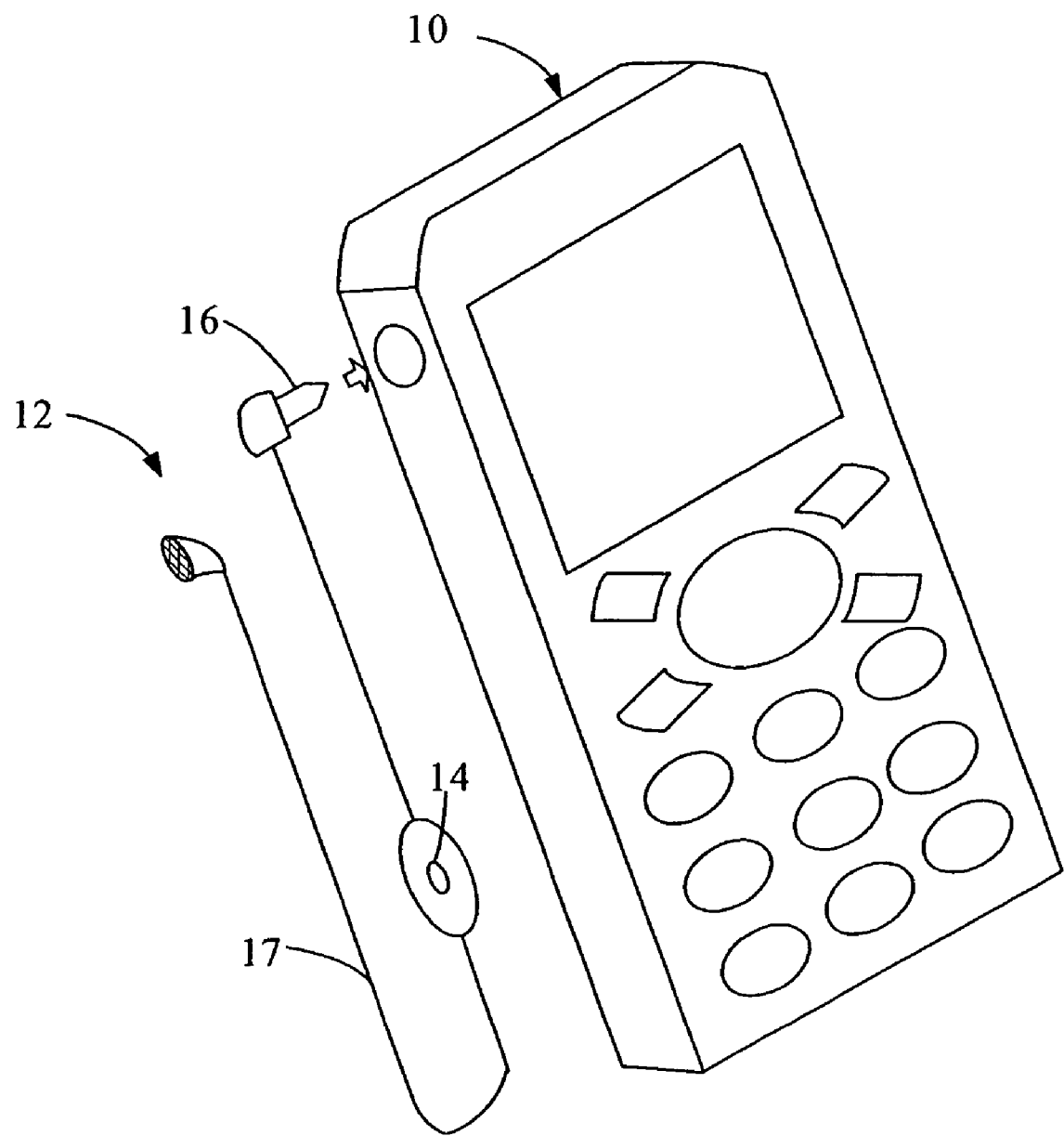
FIG. 1 is an external view of a communication apparatus and an audio receiving/transmitting device according to the present invention.
Figure 2:
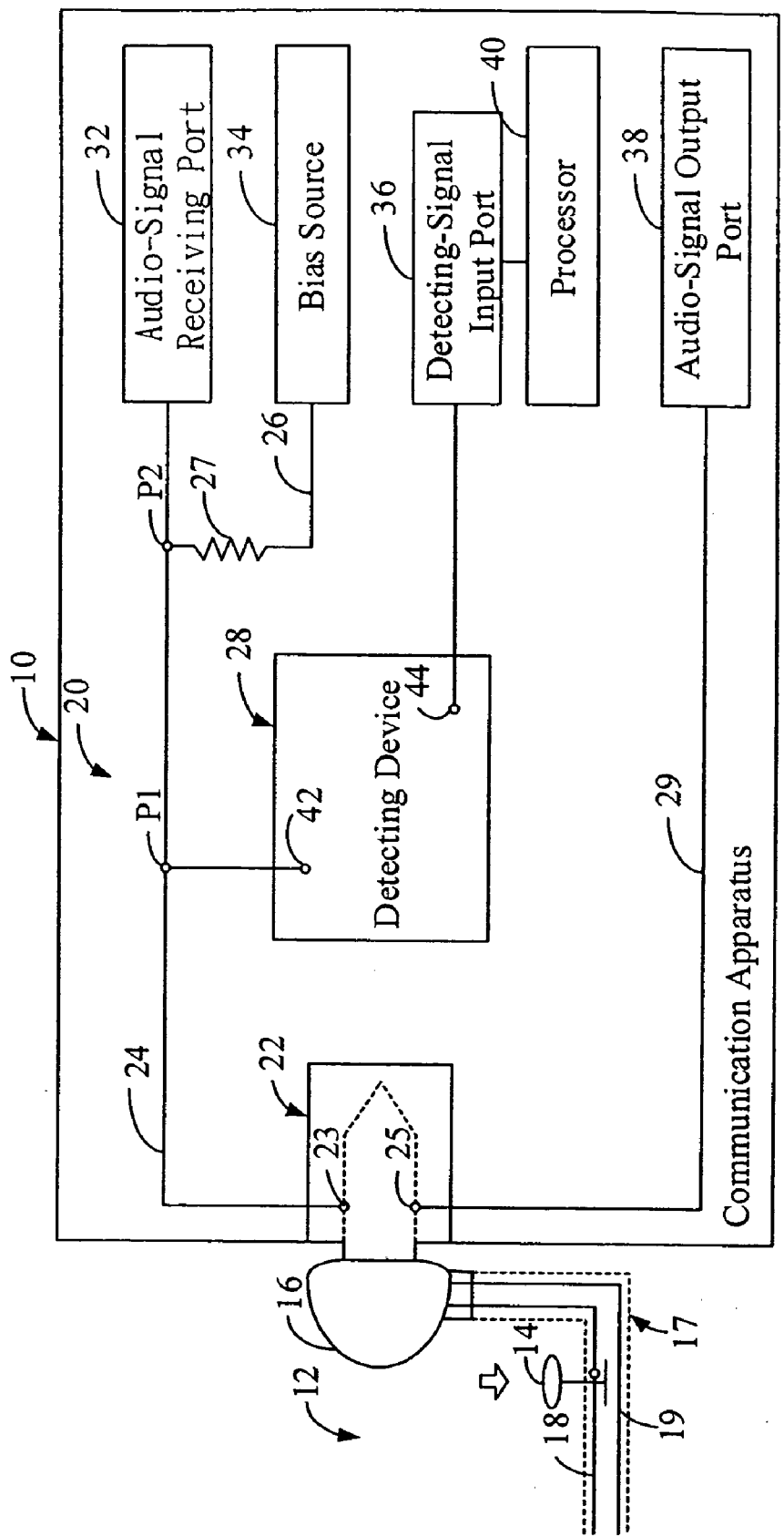
FIG. 2 is a schematic diagram of the circuit according to the present invention.

Referring to FIG. 1, FIG. 1 is an external view of a communication apparatus 10 and an audio receiving/transmitting device 12 according to the present invention; FIG. 2 is a schematic diagram of the circuit 20 according to the present invention. The audio receiving/transmitting device 12 comprises a button 14, a connecting head 16, and a transmitting line 17. In FIG. 1, the arrowhead represents that the audio receiving/transmitting device 12 connects to the communication apparatus 10 by the connecting head 16. The connecting head 16 connects to the transmitting line 17, and the transmitting line 17 comprises an audio-signal input line 18 and an audio-signal output line 19 for transmitting the audio input signal. The button 14 is set on the audio-signal input line 18.

The circuit 20 co-operates with a button 14 of an audio receiving/transmitting device 12 for triggering the on-hook or off-hook function while the communication apparatus 10 is receiving an incoming call or ending the communication. The button 14 is normally closed; that means the audio-signal input line 18 and the circuit 20 remains connected under normal condition.

FIG. 2 only shows a part of the elements of the audio receiving/transmitting device 12; the audio receiving/transmitting device 12 comprises the connecting head 16, the transmitting line 17, and the button 14, wherein the transmitting line 17 comprises the audio-signal input line 18 and the audio-signal output line 19. FIG. 2 also shows a part of the elements of the communication apparatus 10 only; the communication apparatus 10 comprises an audio-signal receiving port 32, a bias source 34, a detecting-signal input port 36, an audio-signal output port 38, and a processor 40. The circuit 20 of the present invention comprises a connecting device 22, and the audio receiving/transmitting device 12 electrically and detachably connects to the connecting device 22 by the connecting head 16. The connecting device 22 comprises an audio-signal input end 23 and an audio-signal output end. The circuit 20 further comprises a first signal line 24 for connecting the audio-signal receiving port 32 and the audio-signal input end 23, a second signal line 26 for connecting the bias source 34 and the first signal line 24, and a third signal line 29 for connecting the audio-signal output end 25 and the audio-signal output port 38.

Moreover, the circuit 20 comprises a detecting device 28; the detecting device can be an analog-to-digital converter. The detecting device comprises a detecting input end 42 and a detecting output end 44. The detecting device 28 electrically connects to the first signal line 24 by the detecting input end 42, and the detecting-signal input port 36 by the detecting output end 44. The detecting-signal input port 36 is a signal input port of the processor 40; the processor 40 processes the inner signal-control functions of the communication apparatus. The place where the detecting device 28 electrically connects to the first signal line 24 is defined as the first connecting point P1. The second signal line 26 comprises a bias resistance 27 which connects to the second signal line 26 in series connection. The place where the second signal line 26 connects to the first signal line 24 is defined as a second connecting point P2.

As shown in FIG. 2, when the communication apparatus 10 receives an incoming call, the audio-signal receiving port 32 and the audio-signal output port 38 prepare to start transmitting or receiving the audio input signal of the audio receiving/transmitting device 12. The bias source outputs a bias voltage $V_b$, which is higher than a threshold voltage $V_t$, to the second signal line 26. When the detecting device 28 is an analog-to-digital converter, the detecting device 28 detects a detecting voltage $V_d$ at the first connecting point P1 and digitizes the voltage value to transmit to the processor 40 by the detecting-signal input port 36.

As shown in FIG. 2, when the audio receiving/transmitting device 12 electrically connects to the connecting device 22, and the communication apparatus 10 receives the incoming call, because the button 14 is normally closed, the whole circuit 20 remains connected. At the moment, the voltage detected by the detecting device 28 is smaller than the bias voltage $V_b$ and the threshold voltage $V_t$, wherein the threshold voltage is about 1.8V; therefore, when the detecting device 28 converts the present voltage to the detecting signal value and outputs to the processor 40, the processor 40 does not activate any function. However, when the button 14 is pressed, the circuit between the audio-signal input end of the connecting device 22 and the audio receiving/transmitting device 12 is temporarily broken. In FIG. 2, the arrowhead represents that the button is pressed, and the switch that originally remains closed is temporarily open and forms a broken circuit. In this situation, the voltage at the first connecting point P1 is approximately equal to the bias voltage $V_b$, wherein the bias voltage is larger than 1.8V. Because the bias voltage $V_b$ is higher than the threshold voltage Vt, when the detecting device 28 converts the present voltage to a detecting signal value and transmits it in the digital-signal form to the processor 40 by the detecting-signal input port 36, the processor 40 would compare the detecting voltage $V_d$ with the threshold voltage $V_t$ stored in the processor 40. If $V_d$ is higher than the threshold voltage $V_t$, the processor 40 activates the on-hook function of the communication apparatus 10. After the on-hook function of the communication apparatus 10 is activated, the users can communicate by the audio receiving/transmitting device 12.

As shown in FIG. 2, if the user wants to end the communication, the user only needs to press the button 14 again. As previously described, the circuit between the audio-signal input end 23 of the connecting device 22 and the audio receiving/transmitting device 12 is temporarily broken again; that further causes the detecting voltage $V_d$ to be higher than the threshold voltage $V_t$ to trigger the off-hook function of the communication apparatus 10. After the off-hook function of the communication apparatus 10 is triggered, the audio communication is ended, and each device connected to the circuit 20 is also shut down.

According to the above description, by controlling the button 14 appended in the audio receiving/transmitting device 12, the present invention can answer an incoming call and hang up the phone when the communication ends. Therefore, it is unnecessary for the user to answer or hang up a phone call through the communication apparatus; the present invention can avoid the disadvantage of the prior art efficiently and improve the efficiency of the audio receiving/transmitting device 12.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A circuit being set in a communication apparatus and co-operating with a button of an audio receiving/transmitting device for triggering an on-hook or off-hook function by pressing the button while the communication apparatus receives an incoming call, the communication apparatus comprising an audio-signal receiving port, a bias source, and a detecting-signal input port, the circuit comprising:

a connecting device comprising an audio-signal input end for electrically and detachably connecting to the audio receiving/transmitting device;

a first signal line for connecting the audio-signal receiving port and the audio-signal input end;

a second signal line for connecting the bias source and the first signal line; and a detecting device for electrically connecting to the first signal line and the detecting-signal input port, wherein a first connecting point is defined as the place where the detecting device electrically connects to the first signal line, the detecting device being used for detecting a detecting signal of a voltage value of the first connecting point and outputting a detecting-signal value of the detecting signal to the detecting-signal input port;

wherein, when the audio receiving/transmitting device is electrically connected to the connecting device, the communication apparatus receives the incoming call, and the button is pressed, a temporarily broken circuit is caused between the audio-signal input end of the connecting device and the audio receiving/transmitting device the temporarily broken circuit further causing the detecting-signal value to be higher than a threshold value, to trigger the on-hook function of the communication apparatus; and wherein, when the on-hook function is activated, the audio receiving/transmitting device is connected to the connecting device, and the button is pressed, the temporarily broken circuit between the audio-signal input end of the connecting device and the audio receiving/transmitting device is caused again and further causes the detecting-signal value to be higher than the threshold value, to trigger the off-hook function of the communication apparatus.

2. The circuit of claim 1, when the communication apparatus receives the incoming call and the audio-signal receiving port is activated to receive an audio input signal from the audio receiving/transmitting device.

3. The circuit of claim 2, wherein the audio receiving/transmitting device comprises an audio-signal input line for transmitting the audio input signal.

4. The circuit of claim 3, wherein the button is set in the audio-signal input line.

5. The circuit of claim 1, further comprising a processor, the detecting-signal input port connecting to the processor, the detecting signal value being inputted into the processor via the detecting-signal input port, and the processor triggering the on-hook and off-hook function of the communication apparatus according to the detecting signal value.

6. The circuit of claim 1, wherein the voltage of the bias source is higher than a threshold voltage, and wherein, when the button is pressed, the detecting signal detected by the detecting device is approximately equal to the voltage of the bias source.

7. The circuit of claim 6, wherein the detecting signal value representing the threshold voltage is equal to the threshold value.

8. The circuit of claim 6, wherein a second connecting point is identified in the place where the second signal line connects to the first signal line, and the first connecting point is located between the audio-signal input end and the second connecting point.

9. The circuit of claim 6, wherein the detecting device is an analog-to-digital converter.

10. The circuit of claim 9, wherein the analog-to-digital converter comprises a detecting input end and a detecting output end, electrically connects to the first signal line by the detecting input end, and electrically connects to the detecting-signal input port by the detecting output end.

11. The circuit of claim 10, wherein the analog-to-digital converter further comprises a bias resistance connecting to the second signal line in series connection.

* * * * *